UNITED STATES PATENT OFFICE.

JACOB J. STORER, OF PORTSMOUTH, NEW HAMPSHIRE.

IMPROVEMENT IN THE PREPARATION OF VEGETABLE FIBER.

Specification forming part of Letters Patent No. 42,319, dated April 12, 1864.

*To all whom it may concern:*

Be it known that I, JACOB J. STORER, of Portsmouth, in the county of Rockingham and State of New Hampshire, have invented a new and useful Improvement in the Preparation of Vegetable Fiber; and I do hereby declare that the following is a full, clear, and exact description of the construction and operation of the same.

My invention relates to certain improvements in the treatment and preparation of fibrous vegetable substances—such as straw of the cereal grains, grasses, leaves containing fibers of long staple, and woody or fibrous stems of plants that contain the same, such as flax, hemp, stalks and leaves of Indian corn, sugar-cane, reeds, rushes, &c.—for impregnating the same, or any of them, with certain chemical substances by the mediation of steam in order to dissolve out the silex, gluten, coloring, and albuminous matters, &c., and to leave the fiber of the material treated clear and free from all substances which would impair its quality or color in manufacture; and the nature of my invention consists in subjecting the vegetable substances above enumerated, or any other containing a fiber fit for the manufacture of cloth, paper, thread, cordage, felt, &c., to the action of steam at various pressures, in which steam certain alkaline and other chemical substances have been dissolved.

To enable others skilled in the art to use my improvement, I will now proceed to describe the same.

The chemical substances which I employ are chiefly potash, soda, soda-ash, ammonia, lime, and the salts or the chemical preparations or equivalent of these, using only such as are soluble in steam and can be vaporized and conveyed by the same. This I accomplish by placing the vegetable substance to be treated in a tight strong vessel and letting in steam upon it at a pressure of about sixty pounds, (barometer,) more or less. The steam may first pass through another tight strong vessel containing the chemicals and become charged with the same in its passage; or the chemicals may be placed in the water of the boiler in which the steam is generated; or they may be placed in a dry state on the bottom or elsewhere in the vessel containing the vegetable substances and the steam be let in upon them. This chemical steam acts as a rapid solvent upon the silex, gluten, coloring-matter, and albuminous substances of the vegetable, rendering them soluble and separable. The pressure and temperature of the steam must be always less than that which will char and destroy the vegetable fiber itself—in most cases less than sixty pounds per square inch of barometrical pressure.

The advantages of this process are, first, it is more rapid than any known or used before, and, second, the fiber is brought into a proper condition for subsequent operations and without breaking or entangling the staple.

Having thus described the nature of my improvement, what I claim as new, and desire to secure by Letters Patent, is—

The use of steam and vapor of water for conveying alkalies and other chemicals, in the manner and for the purposes substantially as described.

JACOB J. STORER.

Witnesses:
JAS. F. ELLIS,
SETH D. WOODBURY.